Nov. 14, 1944.     J. L. HIPPLE     2,362,695
AGRICULTURAL IMPLEMENT
Filed July 14, 1942
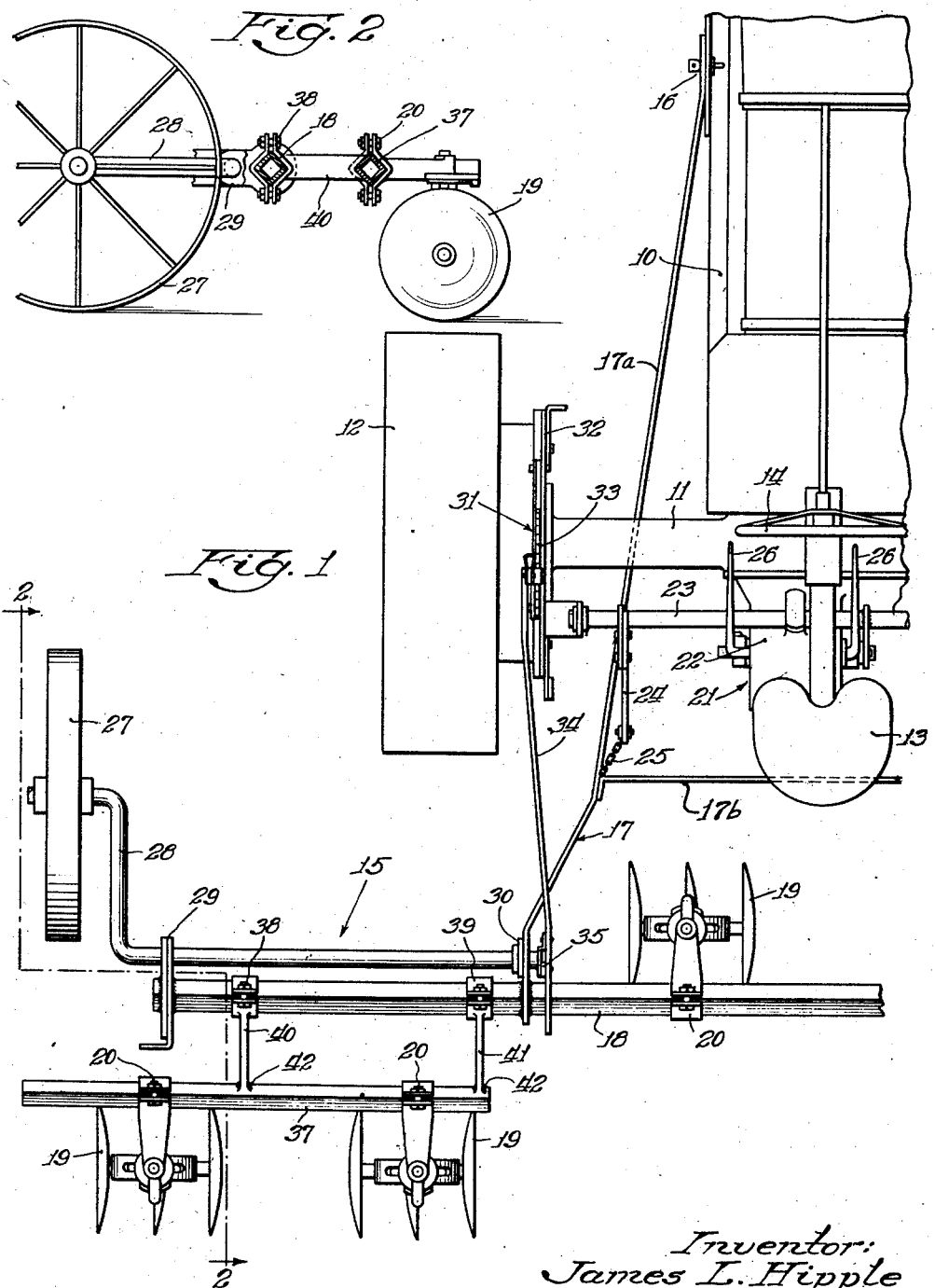
Inventor:
James L. Hipple Patented Nov. 14, 1944

2,362,695

UNITED STATES PATENT OFFICE 2,362,695

AGRICULTURAL IMPLEMENT

James L. Hipple, Canton, Ill., assignor to International Harvester Company, a corporation of New Jersey Application July 14, 1942, Serial No. 450,900

2 Claims. (Cl. 97—232)

This invention relates to agricultural implements and more particularly to a type of agricultural implement adapted for row cultivation, wherein it is desirable that lateral adjustability of the working tools on the tool frame be had in order to adapt the implement for different row spacings.

It is an object of the present invention to provide means for converting an implement of a given width into an implement of greater width of the same type, wherein the working tools may be adjusted for greater row spacings than is possible with the original implement.

It is another object of the invention to provide an attachment for agricultural implements, which can be removably connected to the implement to extend laterally to a point beyond the end of the original implement, wherein the original implement can be readily and easily converted into an implement of greater width.

It is another object of the invention to provide this attachment in the form of a tool bar, wherein the same means used for connecting the working tools to the original implement may be used in connecting the working tools to this attachment.

The invention finds use in territory where there is supplied the usual tool-bar type of equipment for the purpose of initially plowing land and where it is desired to have a tool for the cultivation of crops which are planted in rows of greater distances apart than normal crops, such as corn or cotton, are planted. Thus, the invention would have particular adaptation in sections where sugar cane is grown in rows great distances apart and where some means or implement is necessary for cultivating a plurality of these rows at a time. Hence, there has been provided a tool bar adapted to be connected to the outer ends of the main tool bar of the implement so that it extends laterally to a location upon the end of the main frame for the purpose of supporting working tools considerably further removed from the center of the main frame than is possible with the tool bar of the initial implement. This auxiliary tool bar is attached by clamping devices similar to the clamping devices by which the working tools themselves are connected to the tool bar. The auxiliary tool bar is of similar cross-sectional pattern and is adapted to receive the clamping devices of the working tools. By the use of the present invention, three rows of cane sixty inches apart can be cultivated at the same time.

For other objects and for a better understanding of the invention reference may be had to the following detailed description taken in connection with the accompanying sheet of drawings, in which:

Figure 1 is a plan view of a portion of the tractor and of one half of the implement having the auxiliary tool bar of the present invention attached thereto;

Figure 2 is a view in elevation, partly in section, of the implement and taken along the line 2—2 of Figure 1 and looking in the direction of the arrows thereof.

In the drawing there is shown a tractor 10 having a transversely extending rear axle structure 11 to which is connected a traction wheel 12. On the rear axle structure 11 is an operator's station 13 accessible to a steering wheel 14 by means of which the tractor is steered.

Pivotally connected to the tractor, forwardly of the rear axle structure and for vertical movement, is an agricultural implement 15 and in the manner as indicated at 16. This agricultural implement includes a main tool-carrying frame structure 17 comprising a longitudinally extending beam 17a, one for each side of the tractor, braced by a cross-piece 17b, and carrying a transversely extending tool bar 18. This tool bar is of square cross-section and is adapted to retain working tools 19 when clamped to the same by means of their clamping devices 20.

This implement is of the close-coupled type and when it is desired to move the implement from the field of operation, the implement is lifted by means of a power lift arrangement 21 to a transport position on the tractor. The power lift arrangement includes a power lift mechanism 22 and a rock-shaft 23 journaled on the rear axle structure of the tractor and having a lifting arm 24 connected to the main frame by means of a lost-motion chain 25. When a control lever 26 of the power lift device 22 is actuated, the lever being accessible to the operator's station 13, the power lift device 22 will function to rock the rock-shaft 23 and pull-chain 25 to effect lifting of the implement 15 about its pivotal connection 16 with the tractor.

When the agricultural implement is in its working position so that the working tool 19 functions to cultivate, the main frame 17 is supported on supporting wheels 27 carried on crank axles 28 journaled in brackets 29 and 30 on the tool frame. In order to effect depth adjustment of the working tools 19, the crank axle 28 is adjusted by a manually adjustable mechanism 31 on the rear axle structure 11 of the tractor and which includes an adjusting lever 32 accessible to the operator's station 13 and workable over a quadrant 33. The adjustable lever 32 is connected by a link 34 with the upper end of an arm 35 on the inner end of the crank axle 28. Due to the lost-motion in the chain 25, the implement 15 is free to move vertically when in its working position.

It should now be apparent that with only the tool bar 18 the lateral spacings of working tools 19 thereon would be more or less limited and that the agricultural implement as it stands is useless for cultivating row crops spaced at maximum distances apart, such as up to sixty inches. With the tool bar 18 of its given length, the maximum rows which could probably be cultivated at one time by the tools 19 would be no more than two.

Hence, according to the present invention, there has been provided an auxiliary tool bar 37 of similar cross-sectional pattern to the main tool bar 18 and thus adapted to receive the clamping devices 20 and the working tools 19. This auxiliary tool bar 37 is parallel to the tool-bar 18 and longitudinally spaced therefrom in the direction of advance of the tractor, and is so connected to the transverse end of the main tool bar 18 as to extend laterally thereof to a location whereby working tools 19 can be placed at points laterally of the main tool bar. The tool bar or tool-attaching portion 37 is connected to the main tool bar 18 by clamping devices 38 and 39 of the same type as the clamping devices 20. With these clamping devices, the tool bar 37 can be readily attached or readily detached from the tool bar 18. The clamping devices 38 and 39 are respectively carried on the extension elements 40 and 41 which are in turn welded to the tool bar 37 as indicated at 42. These extension elements extend rearwardly to space the auxiliary tool bar 37 rearwardly of the tool bar 18 so that the tool bar 37 will be removed from such mechanism which may already be disposed on the tool bar 18, such as the crank axle 28, and whereby little interference will be had upon adjusting the working tools on the tool bar 37.

It should now be apparent that there has been provided an attachment adapted for use with tool frames to enlarge upon the width of implements and to thereby convert the initial implement into an implement adapted for cultivating row crops having the maximum spacings. It should also be apparent that this attachment has the advantages of the regular attachments and is easily attachable and detachable from the main tool-bar.

While various changes may be made in the detail construction, it shall be understood that such changes shall be within the spirit and scope of the present invention as defined by the appended claims.

What is claimed is:

1. In combination, a tractor having a rear axle structure, an agricultural implement of one width connected to the tractor forwardly of the rear axle structure and arranged to extend to a location in rear thereof, said agricultural implement including a main tool-carrying frame with a transversely extending tool bar on its rearward end and adapted to have ground-working tools clamped thereon at different row spacings, means for converting the implement into an implement of similar type but having greater width, said converting means including a tool bar portion to which working tools may be similarly clamped and means for detachably clamping the tool bar portion to the main tool bar in longitudinally spaced relation thereto to extend transversely beyond the end thereof, whereby added row spacing of the working tools may be had.

2. In combination, a tractor having a rear axle structure, an agricultural implement of one width connected to the tractor forwardly of the rear axle structure and arranged to extend to a location in rear thereof, said agricultural implement including a main tool-carrying frame with a transversely extending tool bar on its rearward end and adapted to have ground-working tools clamped thereon at different row spacings, an auxiliary tool bar also adapted to have ground-working tools clamped thereon, and means for detachably clamping the auxiliary tool bar to the main tool bar in longitudinally spaced relation thereto to extend laterally beyond the end of the same, whereby added row spacings of the ground-working tools on the implement may be had.

JAMES L. HIPPLE.